United States Patent
Kasai

(10) Patent No.: US 9,250,381 B2
(45) Date of Patent: Feb. 2, 2016

(54) BACKLIGHT DEVICE AND LIQUID CRYSTAL DISPLAY INCLUDING THE SAME

(71) Applicant: SHARP KABUSHIKI KAISHA, Osaka-shi, Osaka (JP)

(72) Inventor: Nobuhiro Kasai, Osaka (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 107 days.

(21) Appl. No.: 14/224,873

(22) Filed: Mar. 25, 2014

(65) Prior Publication Data

US 2014/0293185 A1 Oct. 2, 2014

(30) Foreign Application Priority Data

Mar. 26, 2013 (JP) ................................. 2013-064450

(51) Int. Cl.
*G02F 1/1333* (2006.01)
*F21V 8/00* (2006.01)

(52) U.S. Cl.
CPC .................................. *G02B 6/0088* (2013.01)

(58) Field of Classification Search
CPC .................................................... G02B 6/0091
See application file for complete search history.

(56) References Cited

U.S. PATENT DOCUMENTS

| 2008/0084710 | A1 | 4/2008 | Ohno |
| 2012/0194760 | A1 | 8/2012 | Fukuda |
| 2013/0135559 | A1 | 5/2013 | Deng et al. |
| 2014/0126243 | A1* | 5/2014 | Blessitt et al. ................ 362/612 |

FOREIGN PATENT DOCUMENTS

| CN | 102494273 A | 6/2012 |
| JP | 2003-168311 A | 6/2003 |
| JP | 2008-97877 A | 4/2008 |
| JP | 2012-155236 A | 8/2012 |

* cited by examiner

*Primary Examiner* — Timothy L Rude
(74) *Attorney, Agent, or Firm* — Birch, Stewart, Kolasch & Birch, LLP

(57) ABSTRACT

A backlight device includes: a flat chassis member; a light guide plate stacked on the chassis member; and a light source member attached to the chassis member so as to face a light incident face that is located at a side face of the light guide plate. The light guide plate has, at at least one side face adjacent to the light incident face, a convex part protruding outwardly of the side face, the chassis member has a protruding part to sandwich the convex part, and at least a part of the protruding part is covered with an elastic member that presses the convex part toward the light source member.

6 Claims, 12 Drawing Sheets

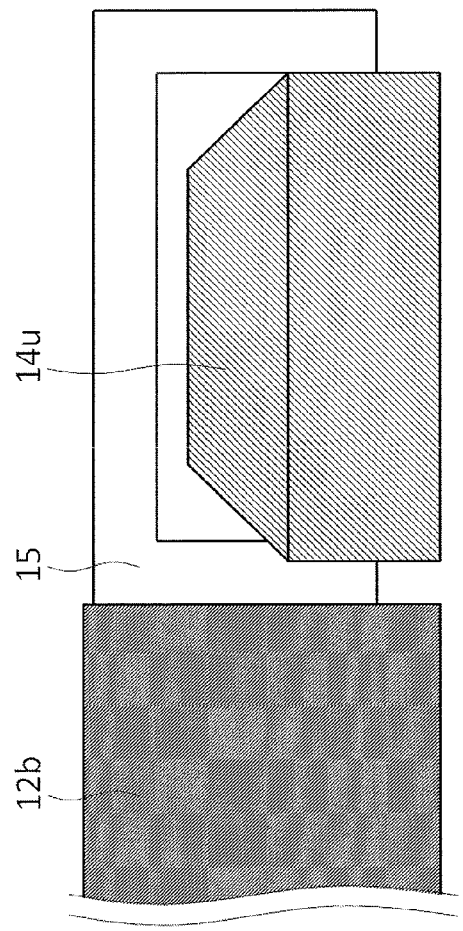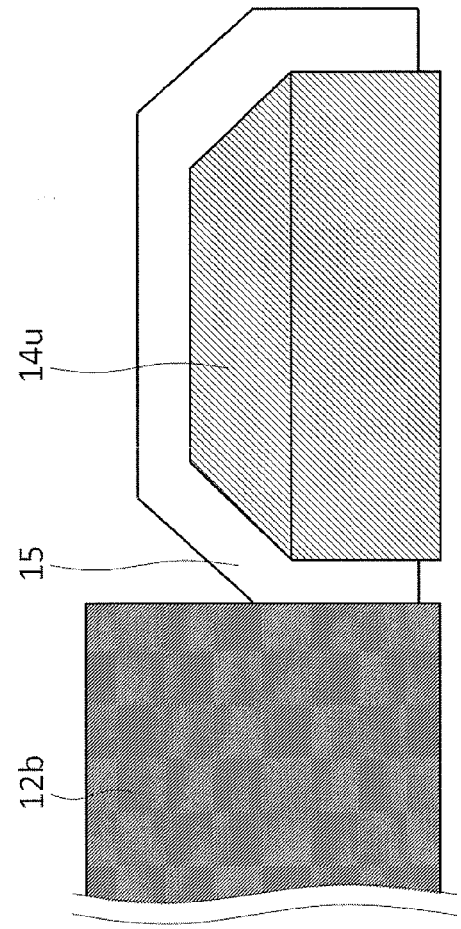
FIG.4A
FIG.4B

BACKLIGHT DEVICE AND LIQUID CRYSTAL DISPLAY INCLUDING THE SAME

CROSS REFERENCE

This Nonprovisional application claims priority under 35 U.S.C. §119(a) on Patent Application No. 2013-064450 filed in Japan on Mar. 26, 2013, the entire contents of which are hereby incorporated by reference.

BACKGROUND OF THE INVENTION

The present invention relates to a backlight device that is used for a liquid crystal display or the like.

A known backlight device used for a liquid crystal display or the like is of an edge-lit type that is provided with a light source at a light incident face located at a side-edge part of a light guide plate.

For light weight and a narrow frame, such a backlight device is provided with a convex part at a part of one side face of the light guide plate, and the convex part is sandwiched between protrusions provided at a frame member for fixing.

For instance, a liquid crystal module disclosed in JP-A-2012-155236 (Patent Document 1) shown in FIG. 11 includes a rectangular convex part 113 at an end face of a light guide plate 102 as well as a pair of bulging convex parts 112A in the form of hollow bosses that is formed at a bottom plate 101b of a rear frame 101, so as to sandwich the convex part 113 between this pair of bulging convex parts 112A from both sides for positioning of the light guide plate 102.

The backlight device of an edge-lit type is configured to include a light-incident face of a light guide plate placed at a predetermined space from a light source such as a fluorescence tube or light emitting diodes (LEDs) disposed in a line. If this space is changed from the appropriate distance due to manufacturing error or displacement during operation, the brightness is lowered or its uniformity deteriorates unfortunately.

To solve this problem, a spread illuminating apparatus 240 disclosed in JP-A-2008-97877 (Patent Document 2) as shown in FIG. 12 includes a light guide plate 234 provided with protruding parts 242 each to be stored in the corresponding recess 244 of an inner frame member 236. The light guide plate 234 is housed inside the inner frame member 236 in such a manner that a part 242b of the protruding part 242 on the side opposite to the side of point light sources 212 is brought into contact with an elastic member 243 and so the light guide plate 234 is biased to the side of the point light sources 212 by pressing force F from the elastic member 243.

Thereby, the light guide plate 234 can be held in the inner frame member 236 while keeping necessary and appropriate clearance d, which is determined considering the extension and contraction balance depending on the physical properties of the materials of the light conductor plate 234 and the inner frame member 236 as well as dimensions in their extension directions.

In such a structure to hold a light guide plate, when the pressing force applied to the light guide plate toward the light source is changed, a distance between the light guide plate and the light source will change to affect the uniformity of brightness.

The spread illuminating apparatus 240 described in Patent Document 2 is configured to bias the light guide plate 234 by brining the elastic member 243 provided in the inner frame member 236 into contact with the protruding part 242, and so in the case of a structure to fix a light guide plate by the pair of bulging convex parts 112A provided at the bottom plate 101b of the rear frame 101 as in Patent Document 1, the elastic member 243 is fixed at a predetermined position and so the pressing force cannot be adjusted.

Then, it is an object of the present invention to provide an edge-lit type backlight device configured so that a distance between a light source and a light guide plate can be adjusted appropriately by adjusting pressing force applied to the light guide plate.

SUMMARY OF THE INVENTION

A backlight device of the present invention includes: a flat chassis member; a light guide plate stacked on the chassis member; and a light source member attached to the chassis member so as to face a light incident face that is located at a side face of the light guide plate. The light guide plate has, at at least one side face adjacent to the light incident face, a convex part protruding outwardly of the side face, the chassis member has a protruding part to sandwich the convex part, and at least a part of the protruding part is covered with an elastic member that presses the convex part toward the light source member.

BRIEF DESCRIPTION OF THE DRAWINGS

FIG. 4A and FIG. 4B are enlarged views of a protruding part and an elastic member of the present invention.

DETAILED DESCRIPTION OF THE INVENTION

Embodiment 1

Figure 1:
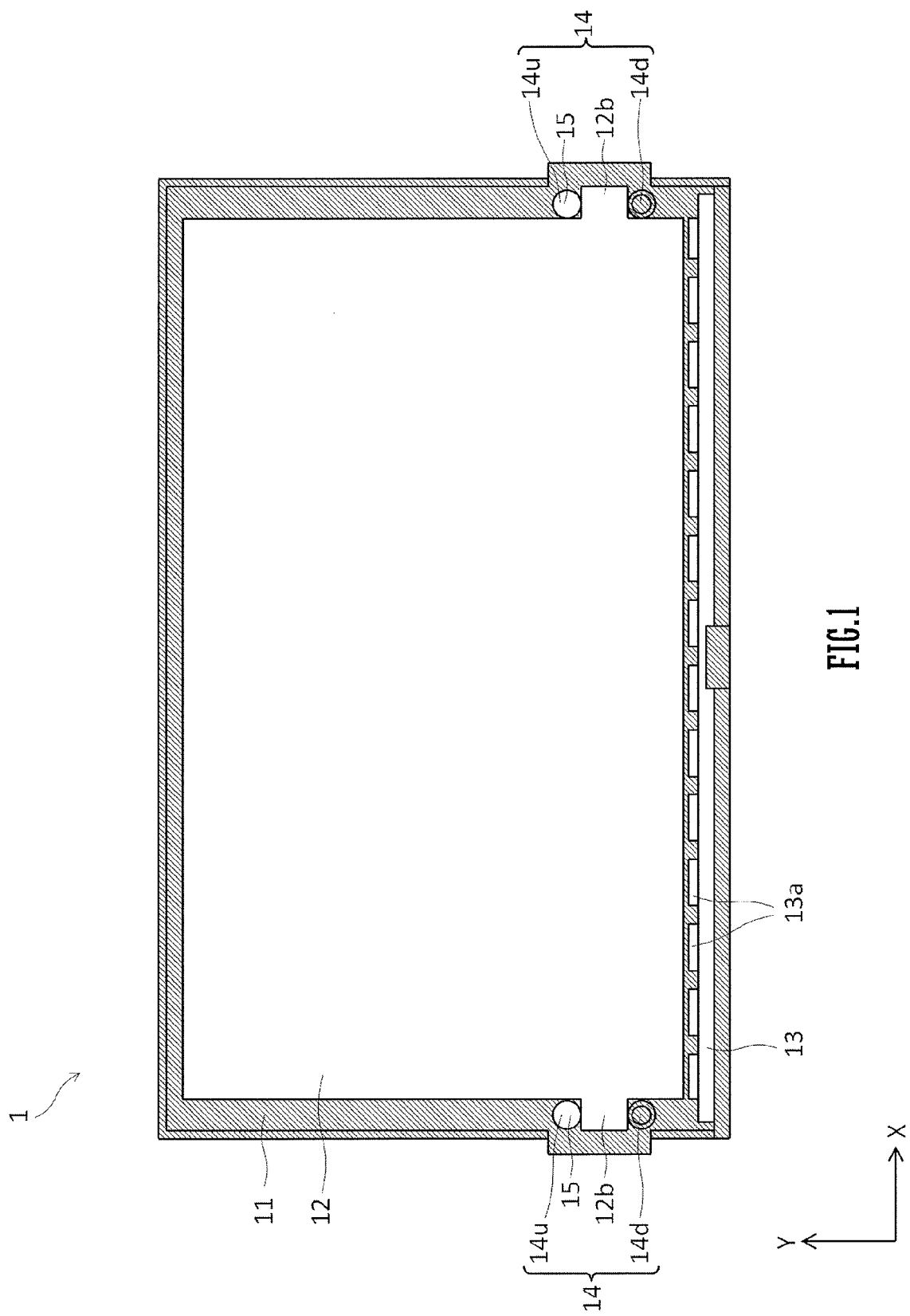
FIG. 1 is a front view of a backlight device according to Embodiment 1 of the present invention.

FIG. 1 is a front view of a backlight device 1 according to Embodiment 1 of the present invention. In the drawing, X-axis represents a horizontal direction, Y-axis represents a vertical direction, and Z-axis represents a direction that is orthogonal to both of the X-axis and the Y-axis. In the following description, X-direction refers to the horizontal direction and Y-direction refers to the vertical direction.

The backlight device 1 mainly includes a backlight chassis 11, a light guide plate 12 and a LED substrate 13. The backlight chassis 11 as a chassis member is a flat member made of metal, and has a side wall at a part of its periphery, thus allowing another member to be housed inside thereof in a stacking manner. The light guide plate 12 is a member made of acrylic resin or polycarbonate, and is housed inside of the backlight chassis 11 in a stacking manner.

The LED substrate 13 as a light source member is provided at a lower part of the backlight chassis 11 in the Y direction, and a plurality of LED elements 13a are linearly disposed and are fixed on the substrate. Light from the LED elements 13a enters from the light incident face that is a lower side face of the light guide plate 12, propagates while being reflected internally of the light guide plate 12, and then is emitted from the surface of the light guide plate 12. The LED substrate 13 is connected to a power supply substrate (not illustrated) via a wiring member. Instead of the LED substrate 13, another light source such as a fluorescence tube may be used.

The following describes a structure to fix the light guide plate 12 to the backlight chassis 11.

The light guide plate 12 includes, on a lower side of each of the left and right side-face parts, a convex part 12b protruding toward the outside. The backlight chassis 11 is provided with protruding parts 14 formed integrally with the backlight chassis 11 so as to sandwich the corresponding convex part 12b therebetween. Each protruding part 14 has a protruding part 14u on an upper side away from the LED substrate 13, and a protruding part 14d on a lower side closer to the LED substrate 13. The protruding part 14 is designed so as to have a small space with the convex part 12b when an elastic member 15 described later is absent. The protruding part 14u is designed so as to have a small space also with the side face of the light guide plate 12 at a part other than the convex part 12b. In the present embodiment, the protruding part 14u and the protruding part 14d have a similar shape, and they may have different shapes. The position or the number of the convex parts 12b is not limited to those of this example.

Each protruding part 14u is covered with the elastic member 15 that is a cap-shaped member made of rubber or the like having a substantially uniform thickness. The elastic member 15 comes into contact with the convex part 12b of the light guide plate 12 to press the convex part 12b downward. This allows the light guide plate 12 as a whole also to be biased downward, and the position thereof is fixed after the distance between the light guide plate 12 and the LED substrate 13 is changed. The elastic member 15 comes into contact with the side face of the light guide plate 12 at a part other than the convex part 12b as well to press the light guide plate 12 inwardly in the X-direction.

Figure 2:
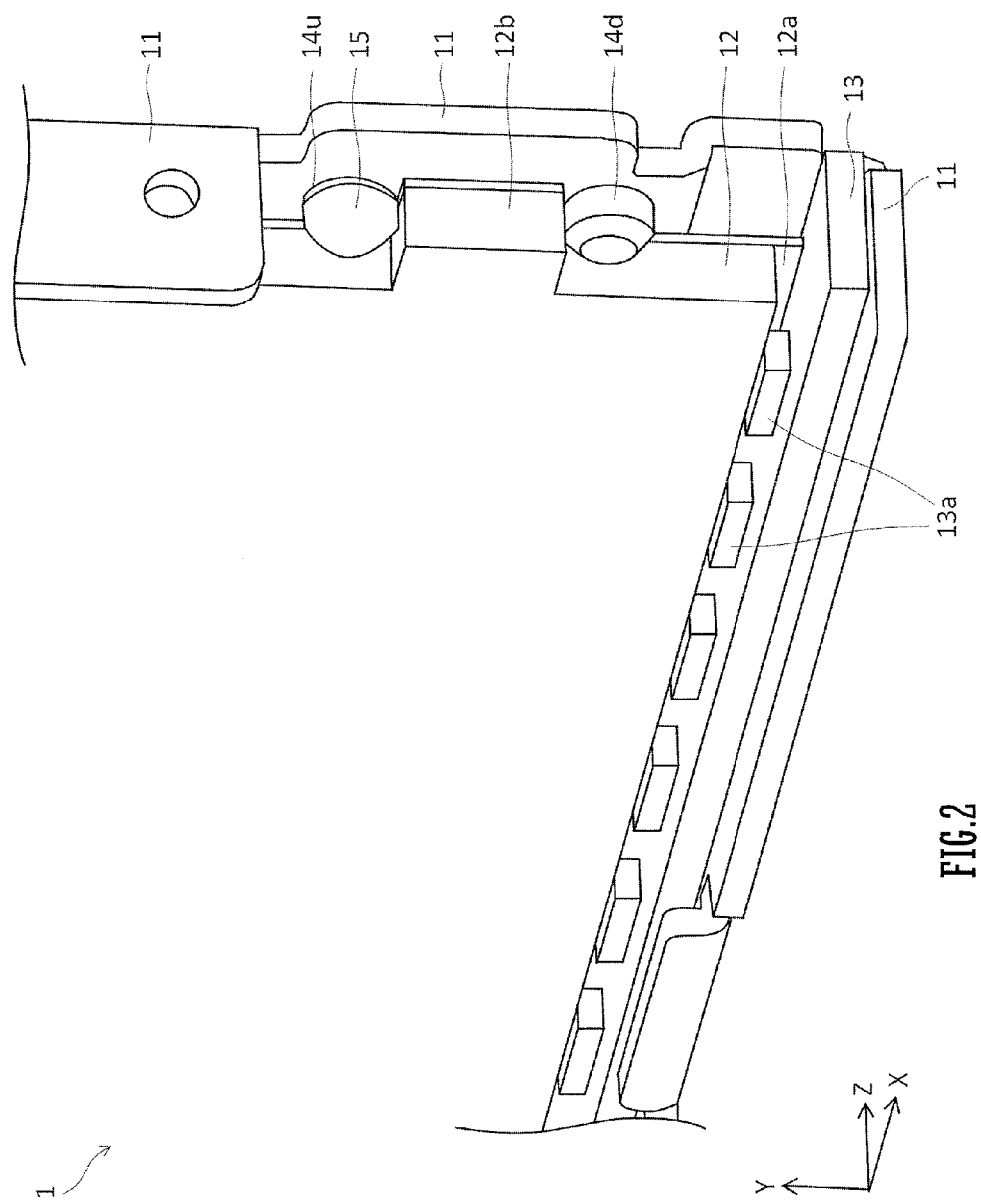
FIG. 2 is a perspective view of the backlight device according to Embodiment 1 of the present invention.

FIG. 2 is a perspective view showing a lower right part of the backlight device 1. The backlight chassis 11 is bent at a substantially right angle at its lower part, and the LED substrate 13 is fixed to the side face on the lower side. The protruding part 14u and the protruding part 14d have a tapered shape that is narrowed from a part of the side face part toward the end. A reflection sheet 12a is attached to the light guide plate 12 on a face, on which the backlight chassis 11 is stacked, thus allowing light emitted from the bottom face of the backlight device 12 to be returned to the inside of the light guide plate 12. As shown in FIG. 2, the backlight chassis 11 is bent as needed depending on the positional relationship with other members such as wiring and a substrate.

Figure 3:
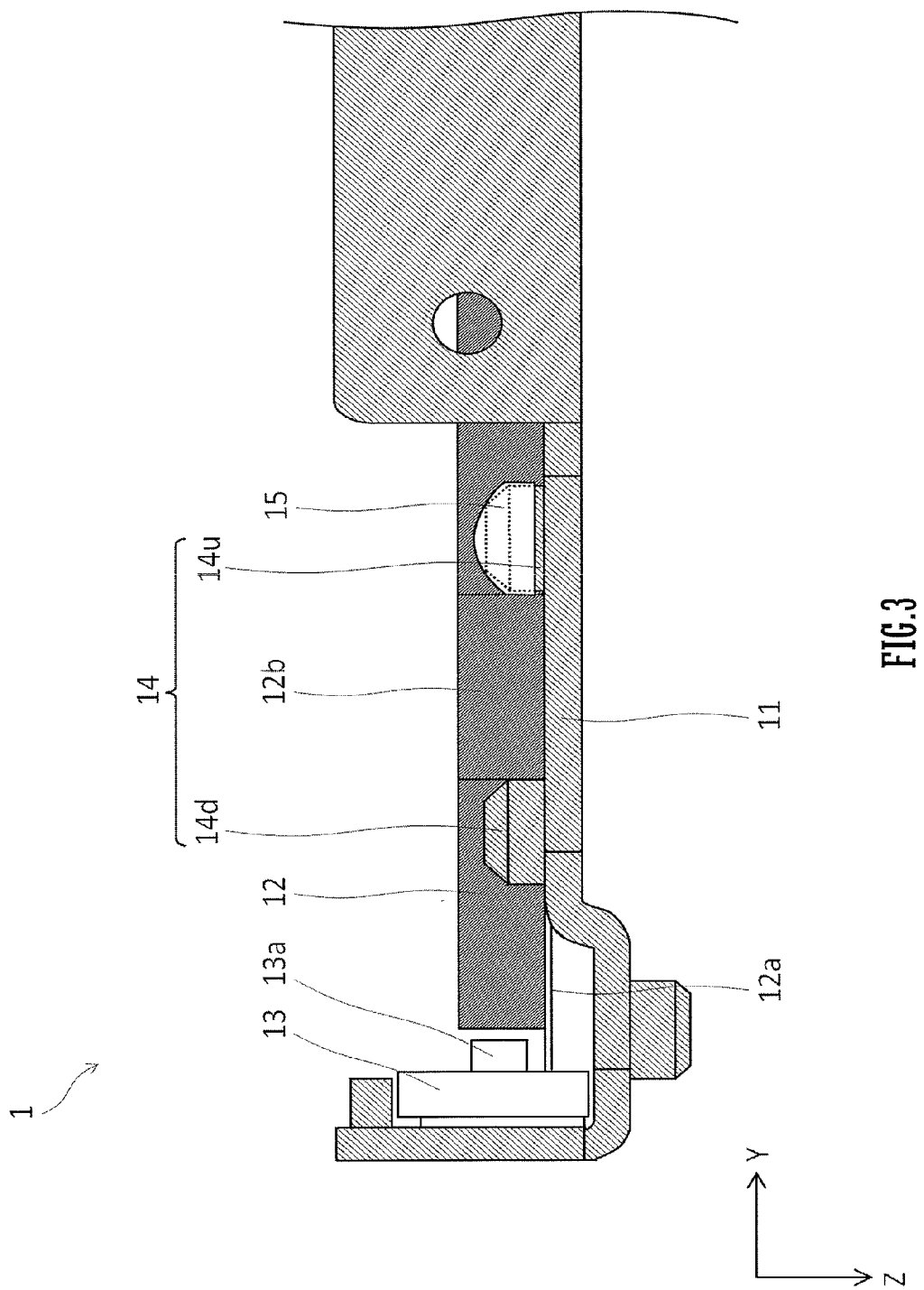
FIG. 3 is a side view of the backlight device according to Embodiment 1 of the present invention.

FIG. 3 is a right-side view of the backlight device 1. As described above, the backlight chassis 11 has, as the integral members, the protruding part 14u and the protruding part 14d to sandwich the convex part 12b of the light guide plate 12 therebetween. The protruding part 14u and the protruding part 14d have a height that is smaller than the thickness of the light guide plate 12, but not limited thereto.

FIG. 4 is an enlarged side view of the protruding part 14u that is covered with the elastic member 15. As shown in FIG. 4A, when the pushing depth of the elastic member 15 is shallow, a part of the elastic member 15 sandwiched between the protruding part 14u and the convex part 12b is small, and so the force to press the convex part 12b by the elastic member 15 also is small. On the other hand, as shown in FIG. 4B, when the pushing depth is deep, a part of the elastic member 15 that is sandwiched with the side-face part of the protruding part 14u that is perpendicular to the bottom face of the protruding part 14 increases, and additionally the inclined face at the side face of the protruding part 14u also sandwiches the elastic member 15. As a result, the force to press the convex part 12b accordingly increases.

As described above, the backlight chassis 11 is provided with the protruding part 14 to sandwich the convex part 12b of the light guide plate 12, and the protruding part 14u on the side away from the LED substrate 13 as the light source is covered with the elastic member 15. Then, the depth to push the elastic member 15 is changed so as to allow the pressing force applied to the convex part 12b of the light guide plate 12 to be changed. As a result, even when actual dimensions of the elements are varied during manufacturing from their designed values, the distance between the light source and the protruding part can be adjusted appropriately. The elastic member filling the gap between the light guide plate and the protruding part can suppress the rattling of the light guide plate during transportation, for example. Further, since the pressing force applied to the light guide plate can be adjusted, damage of the light guide plate and the protruding parts due to excessive force applied thereto can be prevented.

Simply provided protruding parts 14 at a part of the backlight chassis 11 can fix the light guide plate 12, and so there is no need to provide a backlight chassis and a middle frame so as to surround the light guide plate as a whole. As a result, the backlight device 1 can be made lighter in weight and a display device including the backlight device 1 can have a narrow frame. Further since the elastic member 15 is pushed so as to cover the protruding part 14u, the elastic member 15 can be detached easily for repairing, for example, as compared with the case of embedding an elastic member in gap between a frame and a light guide plate that are fitted.

In the present embodiment, the protruding part 14 does not always have a tapered shape, which may be of a cylindrical columnar shape without taper, for example. In such a case also, the pressing force can be changed with the depth to push the elastic member 15.

The protruding part 14 does not always have two separated parts including the protruding part 14u and the protruding part 14d, which may be an integral member like a U-letter shape so as to surround the convex part 12b.

The convex part 12b may be of a shape having a curved line, instead of a rectangular parallelepiped shape.

Although the backlight chassis and the protruding parts may not be an integral member, when they are an integral member as in the present embodiment, backlash between elements becomes less, and so a change in distance between the LED substrate 13 and the light guide plate 12 can be minimized during manufacturing and usage.

Embodiment 2

Figure 5:
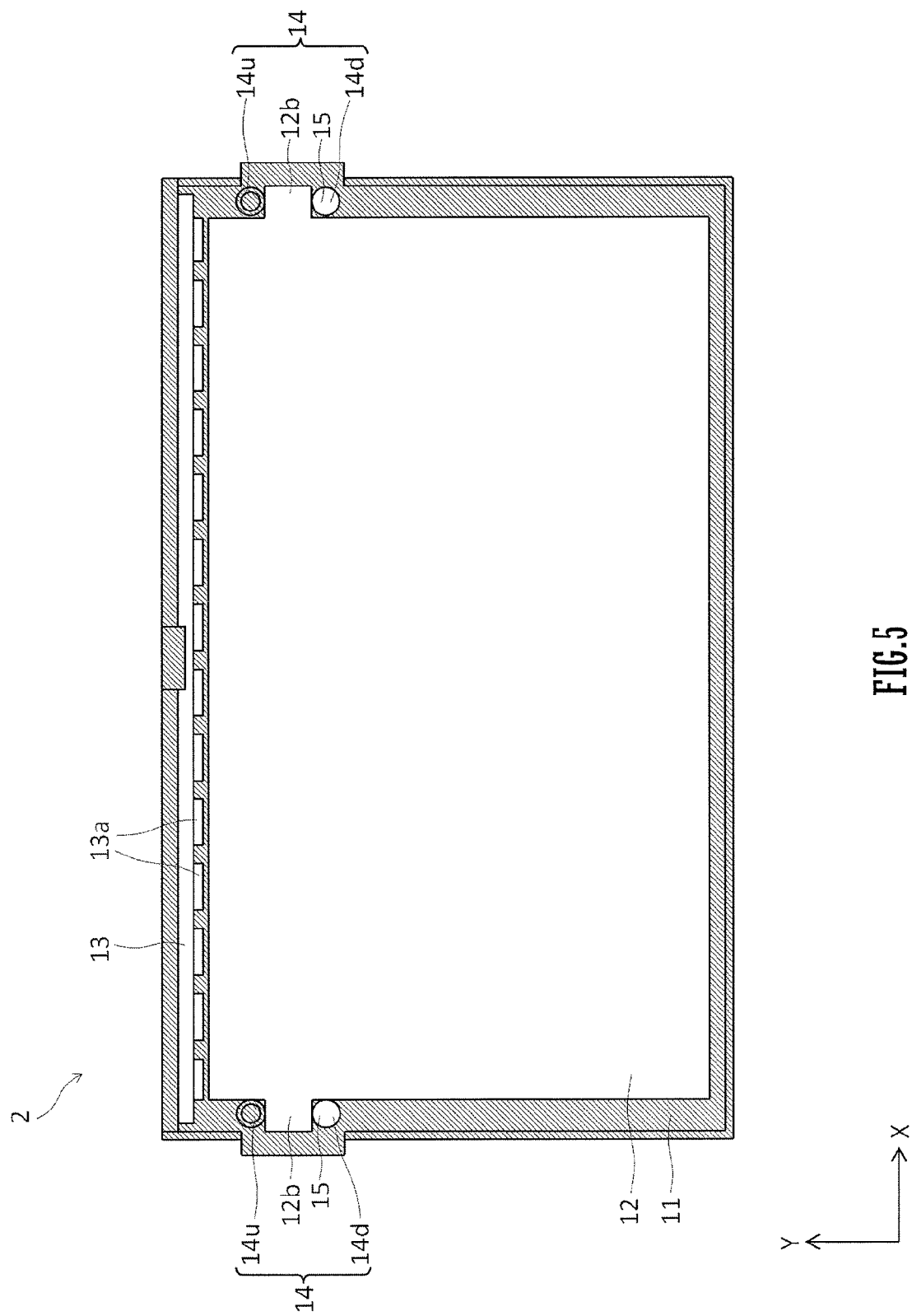
FIG. 5 is a front view of a backlight device according to Embodiment 2 of the present invention.

FIG. 5 is a front view of a backlight device 2 according to Embodiment 2 of the present invention. This backlight device is different from the backlight device 1 of Embodiment 1 mainly in that the device as a whole is reversed vertically. In the following, the same reference numerals as those in Embodiment 1 refer to the same components to omit their descriptions.

The backlight device 2 according to Embodiment 2 includes an LED substrate 13 as a light source member that is attached to an upper part in the vertical direction, so that LED elements 13a emit light downwardly. Light emitted from the LED elements 13a enters from the light incident face that is the upper end face of the light guide plate 12, and propagates through the light guide plate 12.

The light guide plate 12 has convex parts 12b that are provided at left and right side-face parts at upper parts of the light guide plate 12. A backlight chassis 11 has a protruding part 14u above the convex part 12b and a protruding part 14d below the convex part 12b.

Herein, the elastic member 15 is attached to the protruding part 14d at a lower part in the vertical direction. Thus the elastic member 15 presses the light guide plate 12 upward, and fixes the light guide plate 12 after the distance between the light guide plate 12 and the LED substrate 13 is changed.

In Embodiment 2, since the LED substrate 13 is provided at an upper part, force in the direction to move the light guide plate 12 away from the LED substrate 13 acts on the light guide plate 12 due to gravity. Since the protruding part 14d of the present invention is covered with the elastic member 15 for fixation, force to press the light guide plate 12 upward acts, and so in the case of a light source provided on an upper side in the vertical direction as well, the distance between the light source and the light guide plate can be adjusted appropriately.

The present embodiment describes the case of the LED substrate 13 provided at an upper part in the vertical direction, and similar advantageous effects will be obtained in the structure of the LED substrate 13 provided on a left side or a right side of the light guide plate 12 as well. Such a backlight device is especially effectively used for a device that allows a user to change the holding orientation of a display between vertical and horizontal during use like a tablet-type display.

The LED substrate 13 may be provided not only at one side only of the backlight device but also at both of the upper side and the lower side of the backlight chassis 11, for example. In this case, convex parts of the light guide plate and elastic members may be provided so as to apply pressure toward one of the LED substrates 13. Alternatively, pressure may be applied to both of the LED substrates 13, i.e., pressure may be applied to the light guide plate for the upper part of the backlight chassis 11 toward the upper side and for the lower part of the backlight chassis 11 toward the lower side.

Embodiment 3

Figure 6:
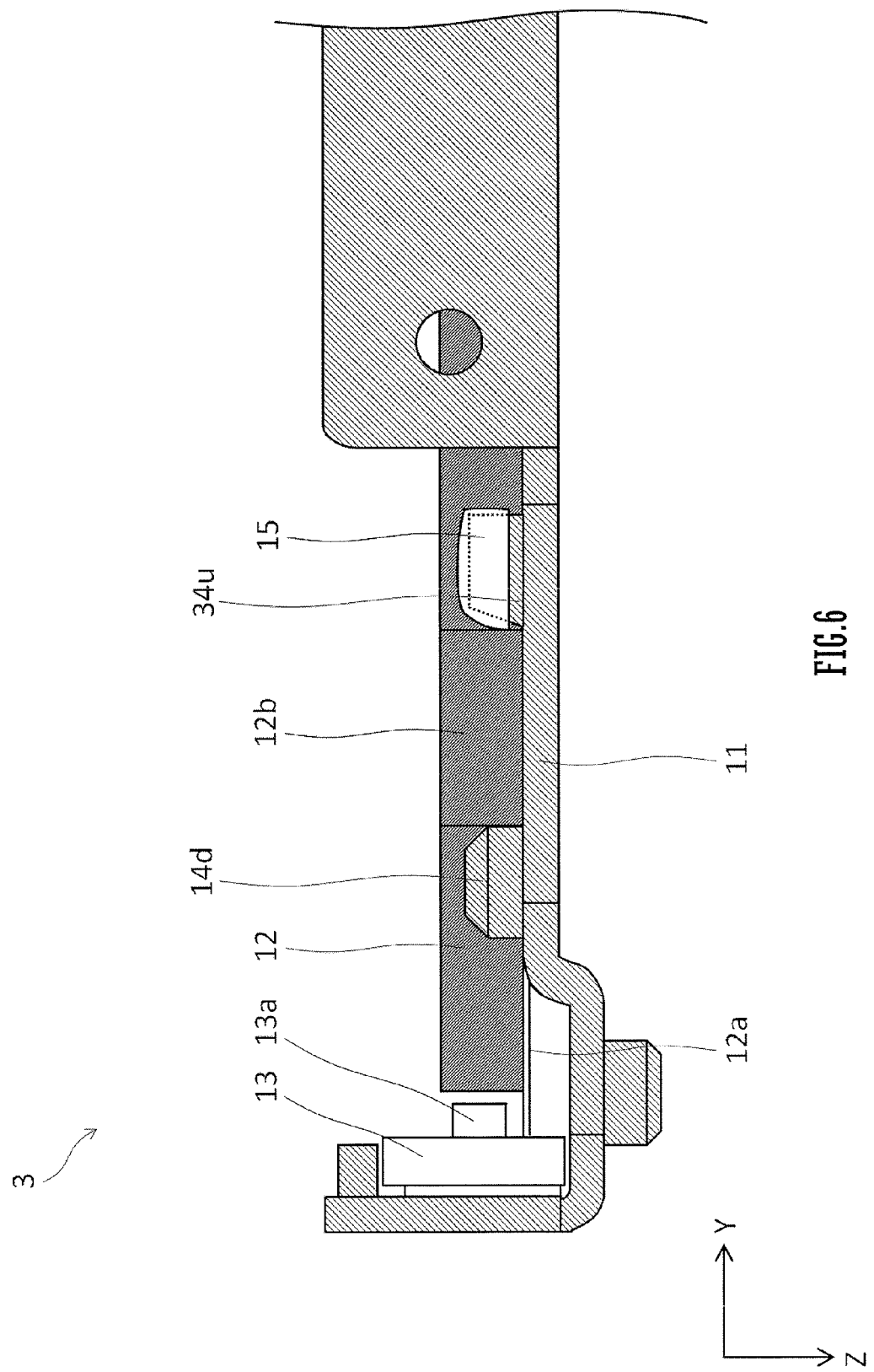
FIG. 6 is a side view of a backlight device according to Embodiment 3 of the present invention.

FIG. 6 is a side view of a backlight device 3 according to Embodiment 3 of the present invention. This backlight device is different from the backlight device 1 of Embodiment 1 only in that a protruding part 34u having a different shape is used instead of the protruding part 14u on the upper side in the Y-direction. The same reference numerals are assigned to the same components to omit their descriptions.

The protruding part 34u provided on the side away from a LED substrate 13 of the backlight device 3 has an inclined face on the side facing a convex part 12b of a light guide plate 12, the inclined face having a distance with the convex part 12b gradually increasing toward the tip end side. That is, the distance between the convex part 12b and the protruding part 34u increases with decreasing the proximity to the backlight chassis 11.

Figure 7C:
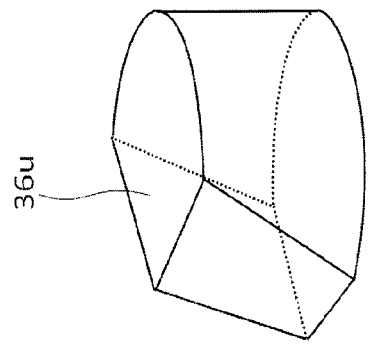
FIG. 7A, FIG. 7B, FIG. 7C and FIG. 7D are perspective views of protruding parts of the present invention.
Figure 7B:
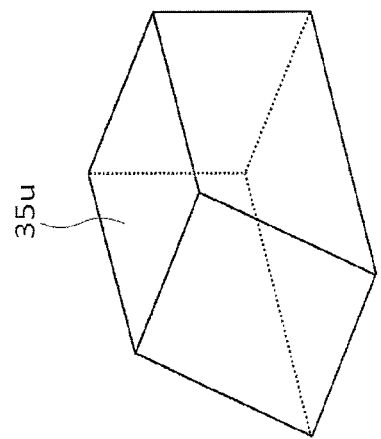
Figure 7A:
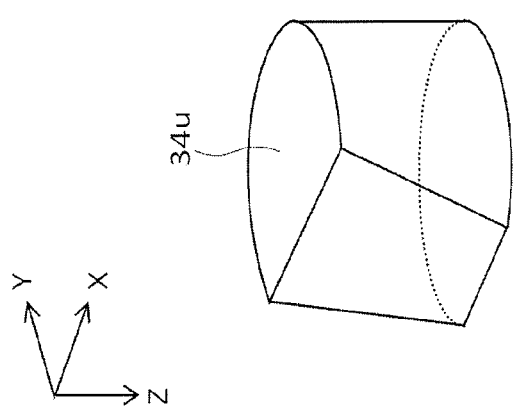

FIG. 7A is an enlarged view of the protruding part 34u. The protruding part 34u has an inclined face in the direction of the convex part 12b of the light guide plate 12. Thus, as the elastic member 15 is pushed more deeply to the protruding part 34u, pressing force applied to the convex part 12b can be made larger. Then, the distance between the light source and the light guide plate can be adjusted appropriately by adjusting the pushing depth of the elastic member 15 without using a different type of the elastic member.

The protruding part 34u is not limited to the example as shown in FIG. 7A having a planar inclination, which may have a curved inclination. The protruding part 34u is not limited to the example based on a cylindrical columnar solid body, which may be based on a rectangular parallelepiped solid body having a face opposed to the convex part 12b of the light guide plate 12 that is an inclination face like a protruding part 35u, for example, as shown in FIG. 7B. In any case, as the elastic member 15 is pushed more deeply, the pressing force applied to the convex part 12b of the light guide plate 12 can be made larger.

Alternatively, as shown in FIG. 7C, this may be like a protruding part 36u that is based on a cylindrical columnar solid body and has another inclined face that is not opposed to the convex part 12b of the light guide plate 12 but is opposed to the light guide plate 12 in the X-direction. In such a case, pushing of the elastic member 15 to the protruding part 36u leads to increase in the pressing force applied to the convex part 12b of the light guide plate 12 as well as can adjust the force to press the light guide plate 12 in the X-direction, and so the light guide plate 12 can be held more stably.

Embodiment 4

The following describes Embodiment 4 that has a feature in the shape of the elastic member, thus holding a light guide plate 12 more reliably.

Figure 8B:
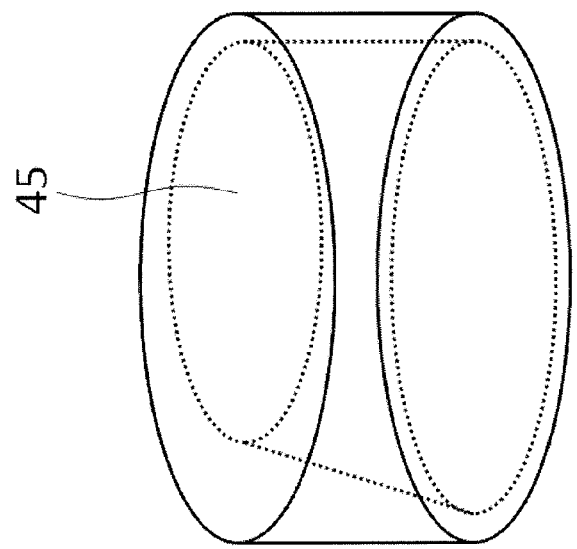
FIG. 8A and FIG. 8B are perspective views of elastic members of the present invention.
Figure 8A:
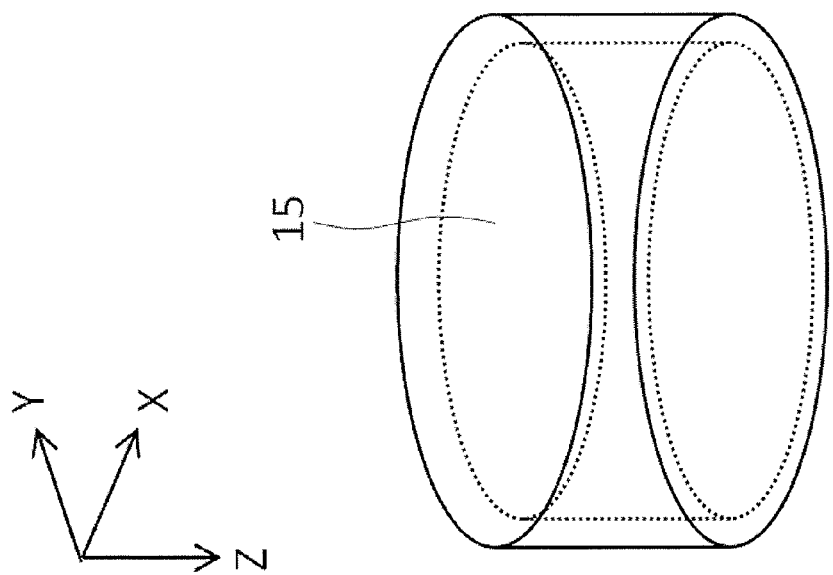

FIG. 8A is an enlarged view of the elastic member 15 used in Embodiment 1. As stated above, the elastic member 15 has a cap-shape having a bottom face that is open, and has a thickness that is substantially uniform. On the other hand, an elastic member 45 of the present embodiment, as shown in FIG. 8B, has a thickness at a part of its side face part that increases with decreasing proximity to the open face at its bottom. Instead of uniformly changing the thickness with decreasing proximity to the opening face at the bottom, there may be a part where the thickness does not change or where the thickness decreases.

Figure 7D:
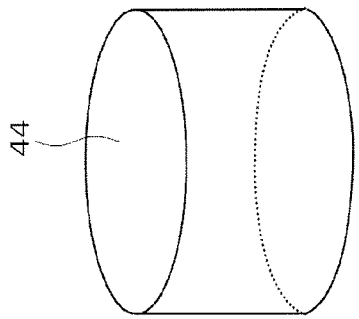

A protruding part to be covered with the elastic member 45 may be a cylindrical columnar protruding part 44 shown in FIG. 7D. The elastic member 45 is put over this protruding part 44 by pushing so that the part of the elastic member 45 changing in thickness is brought into contact with the convex part 12b of the light guide plate 12. That is, the thickness of the elastic member 45 at a part sandwiched between the protruding part 44 and the convex part 12b increases with decreasing proximity to the backlight chassis 11.

This means that as the elastic member 45 is pushed more deeply, the thickness of the elastic member 45 sandwiched between the convex part 12b and the protruding part 44 increases, and as a result, the force to press the convex part 12b by the elastic member 45 becomes larger.

In this way, also when a protruding part to be covered with an elastic member does not have an inclined face, the elastic member 45 having the above feature in shape enables the pressing force to the convex part 12b of the light guide plate 12 to be changed, and so the distance between a light source and the light guide plate can be adjusted appropriately even when actual dimensions of the elements are varied during manufacturing from their designed values.

The above description exemplifies the case of putting the elastic member 45 over the cylindrical columnar protruding part 44, and the combination of the elastic member and the protruding part in their shapes is not limited thereto unless the pressing force can be changed with the depth of the pushing.

Embodiment 5

Figure 9:
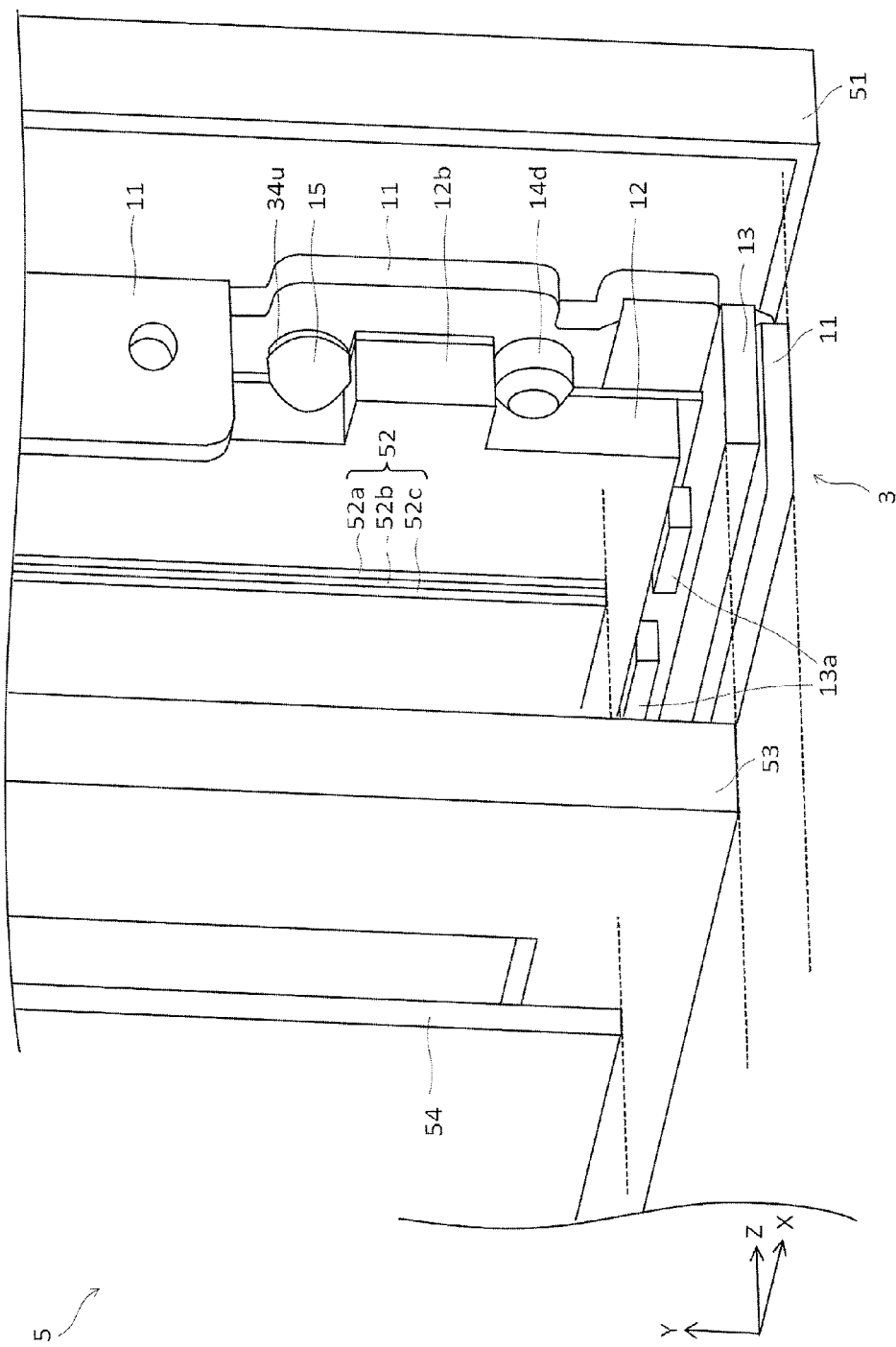
FIG. 9 is a perspective view showing the configuration of a liquid crystal display according to Embodiment 5 of the present invention.

FIG. 9 is a perspective view showing a lower right part of a liquid crystal display 5 including a backlight device of the present invention.

The liquid crystal display 5 includes a back cover 51 as a cover member that is to be attached to the backlight device 3 described in Embodiment 3 on its rear side. An optical sheet 52, a panel chassis 53 and a liquid crystal panel 54 are attached in a stacking manner in this stated order toward the surface on the surface side of the backlight device 3.

The optical sheet 52 is a sheet including the lamination of a diffusion sheet 52a, a lens sheet 52b and a reflective polarized sheet 52c in this stated order from the rear side, and light emitted from the light guide plate 12 passes through these sheets to reach the liquid crystal panel 54.

The panel chassis 53 as a panel chassis member is a frame member to position the liquid crystal panel 54. The liquid crystal panel 54 includes two glass substrates, between which liquid crystal is sealed. Each glass substrate has various electrodes and a color filter (not illustrated) thereon, thus enabling an image to be displayed on its display area in accordance with signals input from a control substrate (not illustrated). The liquid crystal display 5 includes other elements necessary for a display device, such as a video input part, a power supply input part, various substrates and a stand, although not illustrated.

Figure 10:
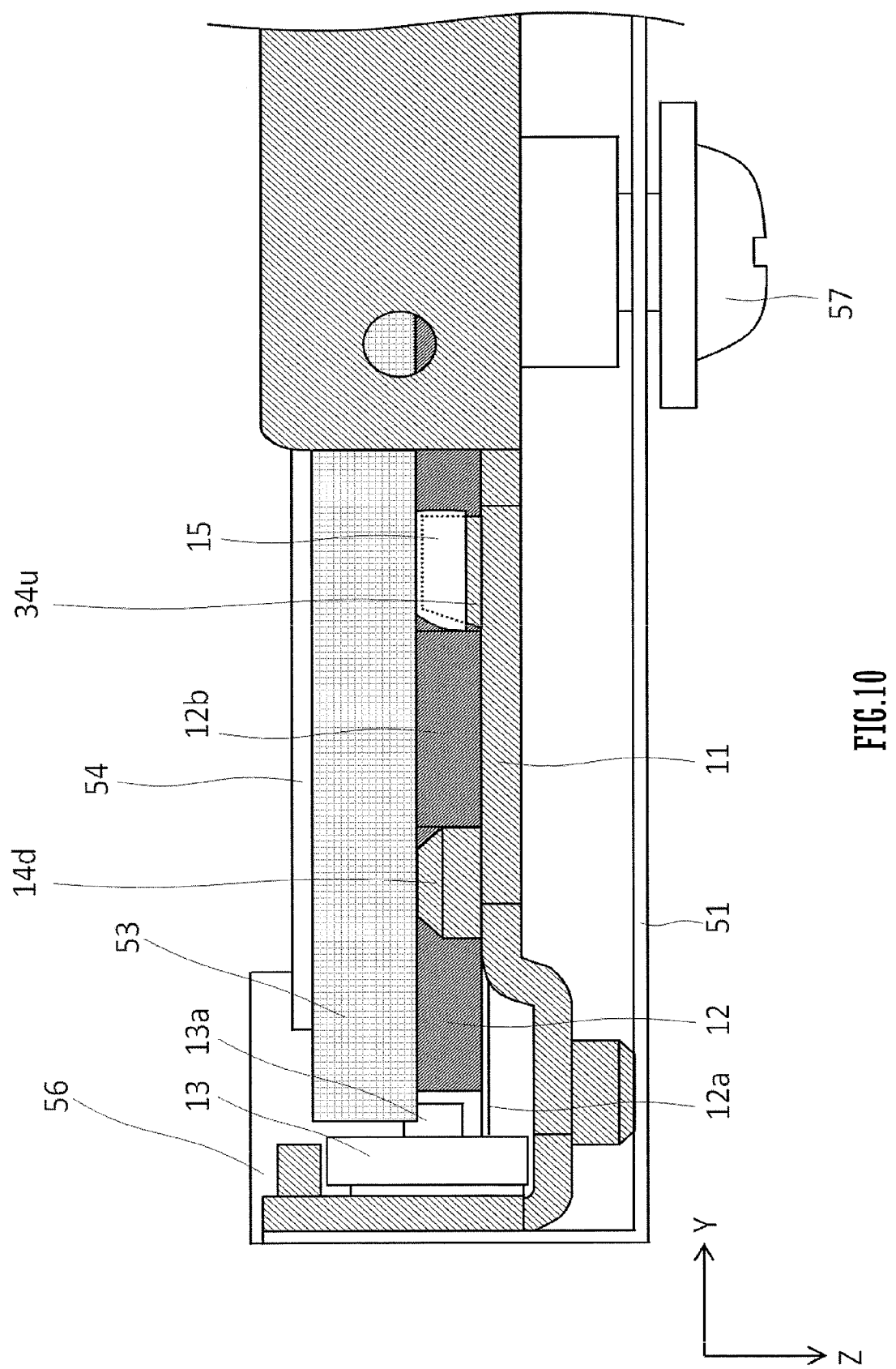
FIG. 10 is a side view showing the configuration of the liquid crystal display according to Embodiment 5 of the present invention.
Figure 11:
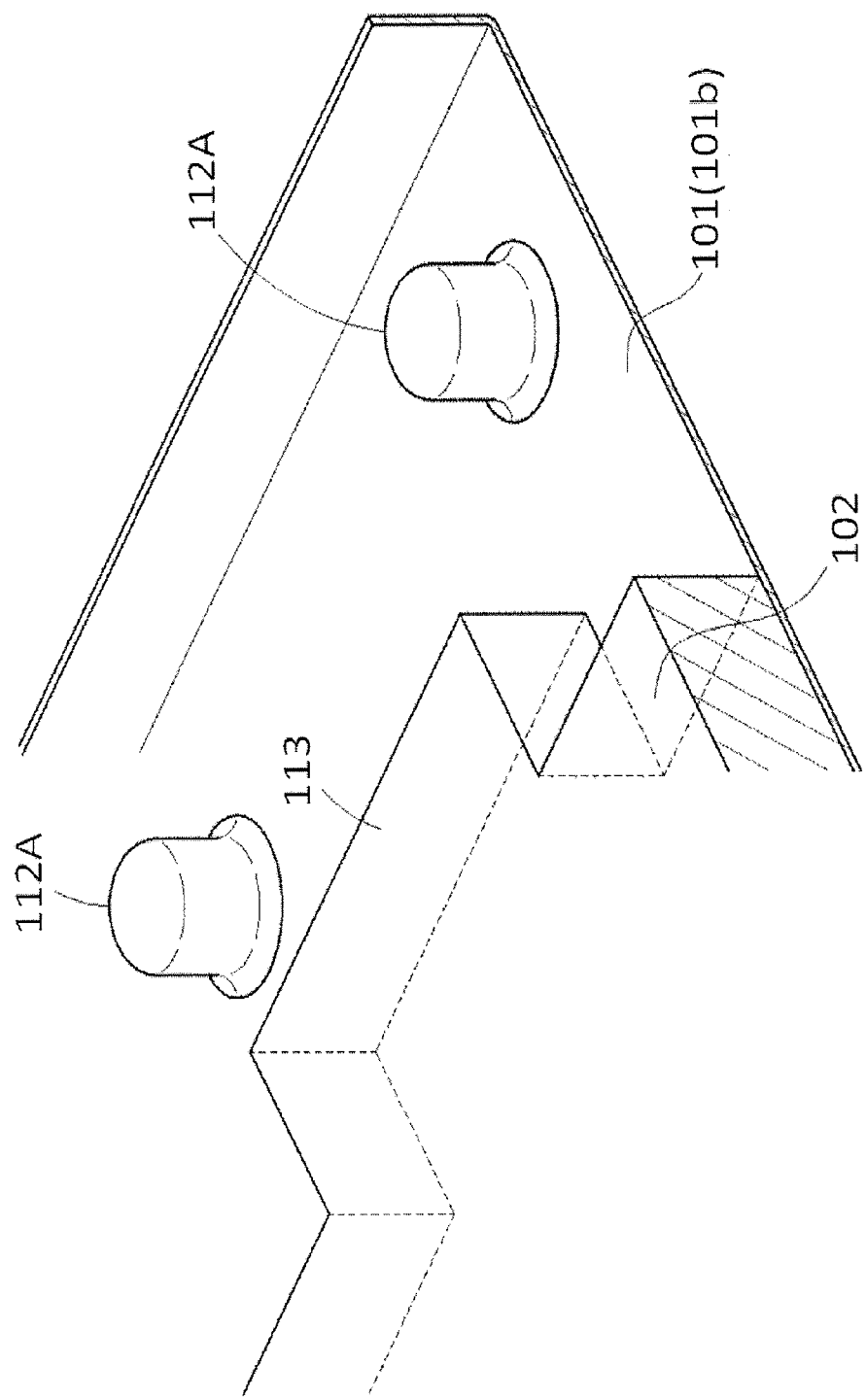
FIG. 11 shows a conventional liquid crystal module.
Figure 12:
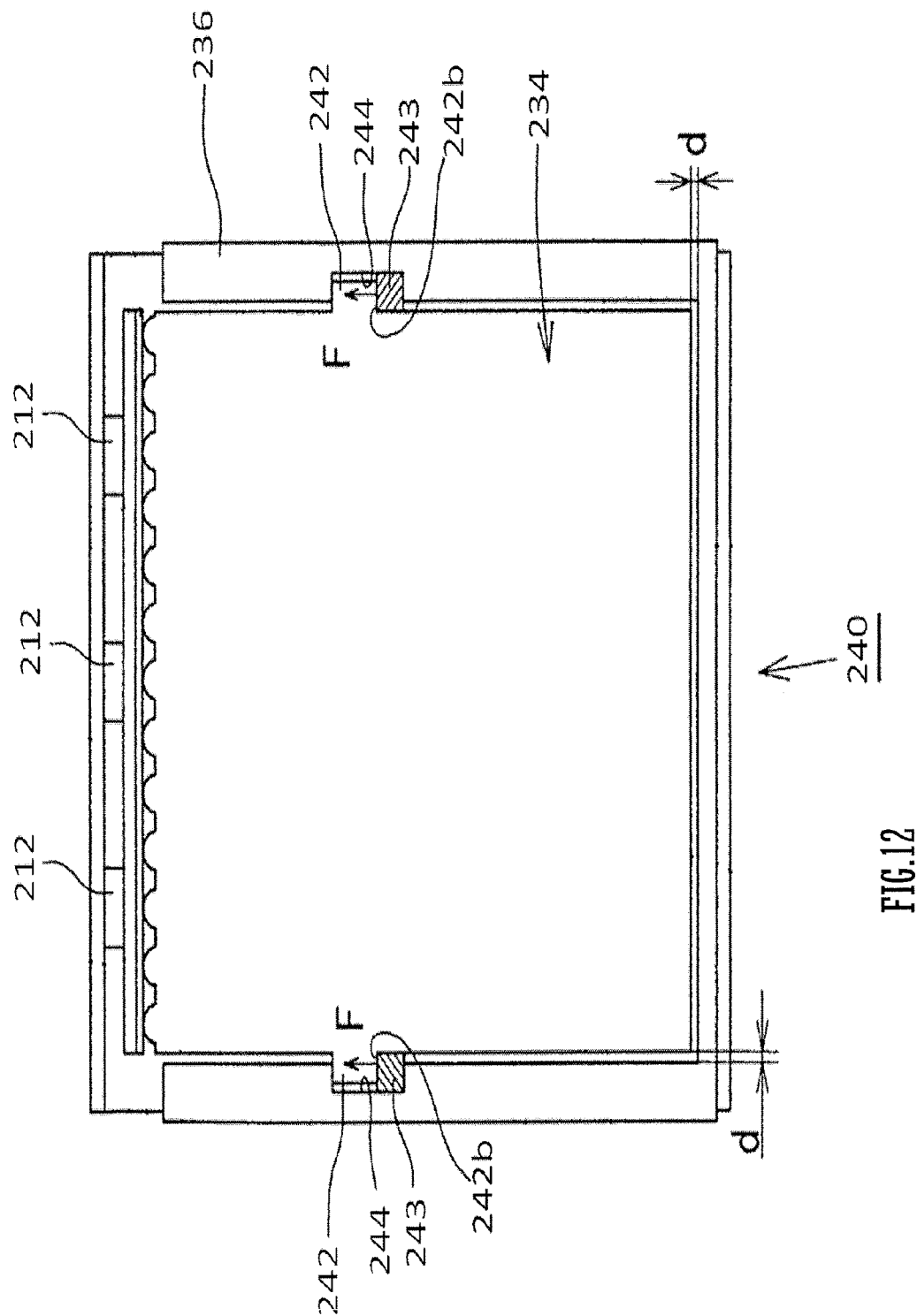
FIG. 12 shows a conventional spread illuminating apparatus.

FIG. 10 is a right-side view of the liquid crystal display 5 at its lower right part. As shown in the drawing, the back cover 51 is fixed to the backlight chassis 11 by a screw member 57. A front cover 56 is disposed on the front-face side of the liquid crystal panel 54.

The panel chassis 53 is assembled so as to fix the liquid crystal panel 54 while pressing the protruding part 34u by its rear face in the direction opposite to the protruding direction.

This can press the elastic member 15 attached to the protruding part 34u from the tip-end direction of the protrusion, and so the distance between the light source and the light guide plate can be adjusted appropriately while preventing the elastic member 15 from coming off from the protruding part 34u. Since the elastic member 15 is pressed by the panel chassis 53, there is another advantage that extra member is not required.

The present embodiment includes the backlight device 3 described in Embodiment 3 to make up the liquid crystal display 5, which may include a backlight device described in Embodiment 1, 2 or 4. In any case, a similar advantageous effect to that of the present embodiment can be obtained.

The above described embodiments are to be considered in all respects as illustrative and not restrictive. The scope of the invention is indicated by the appended claims rather than by the foregoing description. All changes which come within the meaning and range of equivalency of the claims are intended to be embraced therein.

What is claimed is:

1. A liquid crystal display, comprising: a backlight device including:
    a flat chassis member; a light guide plate stacked on the chassis member; and a light source member attached to the chassis member so as
    to face a light incident face that is located at a side face of the light guide plate, wherein
    the light guide plate has, at least one side face adjacent to the light incident face, a convex part protruding outwardly of the side face,
    the chassis member has a protruding part to sandwich the convex part, and
    at least a part of the protruding part is covered with an elastic member that presses the convex part toward the light source member; and
    a liquid crystal panel that is stacked on the light guide plate; and
    a panel chassis member to fix the liquid crystal panel, wherein
    the panel chassis member presses the protruding part covered with the elastic member in a direction opposite to a direction of protrusion of the protruding part.

2. The liquid crystal display according to claim 1, wherein the protruding part has an inclined face at a side face, the inclined face having a distance from the convex part increasing with decreasing proximity to the chassis member.

3. The liquid crystal display according to claim 1, wherein the elastic member has a part sandwiched between the protruding part and the convex part, the part having a thickness increasing with decreasing proximity to the chassis member.

4. The liquid crystal display device according to claim 1, wherein the elastic member is a separate member that is detachable from the protruding part.

5. The liquid crystal display according to claim 2, wherein the elastic member is a separate member that is detachable from the protruding part.

6. The liquid crystal display according to claim 3, wherein the elastic member is a separate member that is detachable from the protruding part.

\* \* \* \* \*